(12) United States Patent
Wu et al.

(10) Patent No.: US 12,497,324 B2
(45) Date of Patent: Dec. 16, 2025

(54) FLEXIBLE AND TUNABLE INFRARED EMISSIVITY MATERIAL PLATFORM

(71) Applicant: THE REGENTS OF THE UNIVERSITY OF CALIFORNIA, Oakland, CA (US)

(72) Inventors: Junqiao Wu, Kensington, CA (US); Kechao Tang, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 632 days.

(21) Appl. No.: 17/817,475

(22) Filed: Aug. 4, 2022

(65) Prior Publication Data

US 2023/0033524 A1 Feb. 2, 2023

Related U.S. Application Data

(63) Continuation of application No. PCT/US2021/018426, filed on Feb. 17, 2021.
(Continued)

(51) Int. Cl.
*B32B 15/04* (2006.01)
*B32B 17/06* (2006.01)
(Continued)

(52) U.S. Cl.
CPC .............. *C03C 3/122* (2013.01); *C03C 4/082* (2013.01); *C03C 17/3417* (2013.01);
(Continued)

(58) Field of Classification Search
CPC ......................... C03C 2217/91; C03C 2217/24
(Continued)

(56) References Cited

U.S. PATENT DOCUMENTS 4,393,095 A * 7/1983 Greenberg .......... C03C 17/3417
438/785
4,401,690 A * 8/1983 Greenberg ............ C03C 17/245
438/785
(Continued)

FOREIGN PATENT DOCUMENTS

CN 107189552 A 9/2017
WO 2021168017 A1 8/2021

OTHER PUBLICATIONS

Emond et al. "Low resistivity WxV1-xO2-based multilayer structure with high temperature coefficient of resistance for microbolometer applications", Applied Physics Letters 107, 143507 (2015) (Year: 2015).*
(Continued)

*Primary Examiner* — Lauren R Colgan
(74) *Attorney, Agent, or Firm* — O'BANION & RITCHEY LLP; John P. O'Banion

(57) ABSTRACT

A material platform with controllable emissivity and fabrication methods are provided that permit the manipulation of thermal radiation detection and IR signal modulation and can be adapted to a variety of uses including infrared camouflage, thermal IR decoys, thermo-reflectance imaging and IR signal modulation. The platform is a multilayer $W_xV_{1-x}O_2$ film with different W doping levels (x values) and layer thicknesses, forming a graded W-doped construct. In $WVO_2$ films with a total thickness <100 nm, the graded doping of W spreads the originally sharp metal-insulator phase transition (MIT) to a broad temperature range, greatly expanding the temperature window for emissivity modulation.

7 Claims, 9 Drawing Sheets

Related U.S. Application Data

(60) Provisional application No. 62/977,852, filed on Feb. 18, 2020.

(51) Int. Cl.
  *C03C 3/12* (2006.01)
  *C03C 4/08* (2006.01)
  *C03C 17/34* (2006.01)
  *C03C 23/00* (2006.01)

(52) U.S. Cl.
  CPC ........ *C03C 23/007* (2013.01); *C03C 2203/52* (2013.01); *C03C 2217/24* (2013.01); *C03C 2218/328* (2013.01)

(58) Field of Classification Search
  USPC .................................................. 428/701, 702
  See application file for complete search history.

(56) References Cited

U.S. PATENT DOCUMENTS

| | | | | |
|---|---|---|---|---|
| 5,450,053 | A * | 9/1995 | Wood | H01Q 5/42 338/14 |
| 6,440,592 | B1 * | 8/2002 | Meyer | C23C 14/083 427/419.7 |
| 6,489,613 | B1 * | 12/2002 | Mori | G01J 5/20 250/338.4 |
| 6,753,075 | B1 | 6/2004 | Leupolz | |
| 7,761,053 | B2 * | 7/2010 | Kruzelecky | C09K 9/00 359/266 |
| 8,197,721 | B2 * | 6/2012 | Stuart | C03C 17/245 427/126.3 |
| 8,609,253 | B2 * | 12/2013 | Chang | C23C 14/352 204/192.16 |
| 8,988,758 | B2 * | 3/2015 | Choi | C03C 17/3417 427/126.3 |
| 9,146,408 | B2 * | 9/2015 | Bae | G02F 1/0147 |
| 9,657,385 | B2 * | 5/2017 | Choi | C03C 17/3417 |
| 9,952,096 | B2 * | 4/2018 | Kats | G02B 5/22 |
| 9,981,872 | B2 * | 5/2018 | Ko | C23C 14/083 |
| 2007/0048438 | A1 * | 3/2007 | Parkin | C03C 17/245 427/126.3 |
| 2009/0253369 | A1 * | 10/2009 | Kruzelecky | C09K 9/00 455/90.3 |
| 2011/0080631 | A1 * | 4/2011 | Moon | C03C 17/3417 428/457 |
| 2013/0335803 | A1 * | 12/2013 | Bae | G02F 1/0147 359/288 |
| 2014/0002886 | A1 * | 1/2014 | Choi | G02F 1/009 359/288 |
| 2017/0313595 | A1 * | 11/2017 | Tsuchiya | H01L 21/02581 |
| 2021/0063612 | A1 * | 3/2021 | Gorodetsky | C23C 14/083 |

OTHER PUBLICATIONS

Zhang et cl "Crystallization and inter-diffusional behaviors in the formation of VO2(B) thin films with layers W-doping" Journal of Advanced Ceramics 2017, 6(3) 196-206 (Year: 2017).*

Wan, Dongyun et al., "High-Performance thermal sensitive W-doped VO2(B) thin film and its identification by first-principles calculations", Applied Surface Science 397 (2017) 30-39, published online Nov. 11, 2016.

Liu, Dongqing et al., "Thermochromic properties of W-doped VO2 thin films deposited by aqueous sol-gel method for adaptive infrared stealth application", Infrared Physics & Technology, 77, Jun. 17, 2016, pp. 339-343.

Mao, Zhiping et al., "Infrared stealth property based on semiconductor (M)-to-metallic (R) phase transition characteristics of W-doped VO2 thin films coated on cotton fabrics" Thin Solid Films, 558, Feb. 20, 2014, pp. 208-214.

ISA/US, United States Patent and Trademark Office (USPTO), International Search Report and Written Opinion issued Jun. 11, 2021, related PCT international application No. PCT/US2021/018426, pp. 1-12, with claims searched, pp. 13-16.

* cited by examiner

FLEXIBLE AND TUNABLE INFRARED EMISSIVITY MATERIAL PLATFORM

CROSS-REFERENCE TO RELATED APPLICATIONS

This application claims priority to, and is a 35 U.S.C. § 111(a) continuation of, PCT international application number PCT/US2021/018426 filed on Feb. 17, 2021, incorporated herein by reference in its entirety, which claims priority to, and the benefit of, U.S. provisional patent application Ser. No. 62/977,852 filed on Feb. 18, 2020, incorporated herein by reference in its entirety. Priority is claimed to each of the foregoing applications.

The above-referenced PCT international application was published as PCT International Publication No. WO 2021/168017 A1 on Aug. 26, 2021, which publication is incorporated herein by reference in its entirety.

STATEMENT REGARDING FEDERALLY SPONSORED RESEARCH OR DEVELOPMENT

This invention was made with Government support under Grant No. 1608899 awarded by the National Science Foundation, and under Contract No. DE-AC02-05CH11231 awarded by the Department of Energy. The Government has certain rights to this invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to materials and coatings with low infrared emissivity and more particularly to a material with tuned IR emissivity based on thin films of vanadium oxide ($VO_2$) with graded tungsten (W) doping across the thickness of the film. The material enables a mechanically flexible infrared camouflage and the manipulation of thermal radiation and IR signals.

2. Background

As a result of the natural thermal emissions of objects, it is possible to discern people, animals, or objects in infrared images. Infrared cameras and sensors are widely used to provide security by detecting thermal emissions at night and in other low-light situations. Infrared images of conventional infrared cameras typically have a background that is darker in color than the brighter colors used to depict warmer objects.

In some settings, it may be advantageous to military or law enforcement personnel to avoid infrared detection in dangerous environments with the use of infrared camouflage. Like camouflage materials that mask with identical color to background in the visible spectrum, infrared camouflage attempts to mask the presence of objects in infrared images by making it difficult to distinguish them from the background by making the objects appear to be a similar dark color as the background.

Various attempts have been made to provide materials that can be used for infrared camouflage with limited success. One approach is to try to match the infrared emissions of a person or object to the cooler background with a coating or covering. For example, actively cooled or heated thermal suits that reduce the thermal signature of a person or heated or cooled plates have been attempted to reduce the contrast between a cold background and an object.

Other IR camouflage techniques use a coating whose emissivity can be modulated by the effects of thermochromics, electrochromics, photocarrier doping, or mechanical actuation. These active camouflage techniques generally require an energy input to operate and the devices are based on rigid and complicated heterostructures. They are also typically limited to only camouflage objects that exhibit uniform and slow-varying temperature profiles. Therefore, there is a need for new camouflage materials with an effective emissivity in the infrared range that are mechanically flexible and do not require power inputs.

According to the Stefan-Boltzmann law, thermal radiation of a black body is proportional to the fourth power of absolute temperature ($T^4$). The heat radiated by common materials is a portion of this limit, with the portion named integrated emissivity ($\varepsilon_{int}$). The $\varepsilon_{int}$ in most materials is independent or only weakly dependent on temperature, since temperature variations cause a significantly smaller perturbation in energy compared to typical radiative electronic and phononic processes. As a result, the thermal radiation in typical materials still follows the $T^4$ law. This is the mechanism behind most infrared imaging and remote thermal sensing technologies. On the other hand, this puts a limit to the ability to regulate the radiative signal and energy.

Vanadium oxide ($VO_2$) breaks this confinement due to its well-known temperature driven metal-insulator phase transition (MIT) at $T_{MIT}$~67° C. When temperature ramps up above $T_{MIT}$, $VO_2$ switches to the metallic phase and becomes much more reflective than the insulating phase over the thermal infrared (IR) spectral range (5 μm-20 μm), causing a decrease in the IR absorptivity. According to Kirchhoff's law, this indicates an abrupt drop of $\varepsilon_{int}$ and thermal radiation at $T_{MIT}$, which enables IR radiative regulation beyond the $T^4$ law. Conveniently, by doping $VO_2$ with tungsten to form $W_xV_{1-x}O_2$, the $T_{MIT}$ can be effectively shifted from 67° C. down to beyond −100° C. a rate of d $T_{MIT}(x)/dx$=−25° C./at. %, adding flexibility in the tuning of thermal radiation. However, in $VO_2$ or any uniformly doped $W_xV_{1-x}O_2$, the abrupt nature of the MIT limits any application of this property within a narrow temperature window around $T_{MIT}$.

BRIEF SUMMARY

Systems and methods are provided that permit the manipulation of thermal radiation detection and IR signal modulation that can be adapted to a variety of uses requiring infrared camouflage or thermal IR decoys. The material platform can also be applied to technologies based on IR reflectance, such as thermo-reflectance imaging and IR signal modulation.

Thermal radiation from a black body increases with the fourth power of absolute temperature ($T^4$). Typical materials radiate heat at a portion of this limit, where the portion, called integrated emissivity ($\varepsilon_{int}$), is insensitive to temperature ($|d\varepsilon_{int}/dT|\sim 10^{-4}/°$ C.). The resultant radiance bound by the $T^4$ law limits the ability to regulate radiative heat. An unusual material platform is provided in which $\varepsilon_{int}$ can be engineered to decrease in an arbitrary manner near room temperature ($|d\varepsilon_{int}/dT|\sim 8\times 10^{-3}/°$ C.), enabling unprecedent manipulation of infrared radiation. For example, it is possible to program $\varepsilon_{int}$ to vary with temperature as inverse of $T^4$, precisely counteracting the $T^4$ dependence, hence thermal radiance from the surface becomes temperature-independent, allowing the fabrication of a flexible and power-free infrared camouflage with a unique advantage in performance stability. The structure is based on thin films of tungsten doped vanadium dioxide where the tungsten fraction is judiciously graded across a thickness less than the skin depth of electromagnetic screening.

In one embodiment, a material platform according to the present technology comprises a $WVO_2$ thin film with graded W doping and a total thickness of less than about 100 nm. The platform comprises a multilayer $W_xV_{1-x}O_2$ structure with different W doping levels (x values), forming a graded W-doped film driven by the thermal diffusion of W during film deposition and post-deposition anneal.

The annealing process is preferably performed by baking the layered film in $O_2$ environment under controlled pressure but may also be performed by focusing a pulsed laser on the $WVO_2$ layers.

However, in $VO_2$ or any uniformly doped $W_xV_{1-x}O_2$, the abrupt nature of the MIT limits any application of this property within a narrow temperature window around $T_{MIT}$. In a $WVO_2$ film with a thickness of less than about 100 nm, the graded doping of W spreads the originally sharp MIT to a broad temperature range, greatly expanding the temperature window for emissivity modulation. Depending on the composition and configuration of W doping, the $\varepsilon_{int}$ within the atmospheric transparency window (about 8 μm to about 14 μm) can be engineered to decrease in an arbitrary manner from about 0.75 to about 0.35 over a temperature range up to about 50° C. from about room temperature, far beyond the capability of regular materials.

The large range of emissivity tuning and flexible adjustability is beyond the capability of conventional materials or structures and provides a new platform for the manipulation of thermal radiation and IR signals. For example, the platform design enables a mechanically flexible and power-free infrared camouflage, which is inherently robust and immune to drastic temporal fluctuation and spatial variation of temperature. By tailoring structure and composition, the material platform can create a surface with a robust and arbitrary IR temperature image, regardless of the actual temperature distribution on the targets. This design of an infrared "decoy" not only passively conceals the real thermal activity of the object, but also intentionally fools the camera with a counterfeited image.

While the features greatly expand the application of radiative camouflage to inhomogeneous and dynamic environments as well as IR decoying, they also inspire novel device concepts based on reflection or transmission of IR signals. As expected, over the broad spectral range from near-IR (down to the plasma wavelength of about 1.2 μm) to the far-IR, the reflectivity of the graded $WVO_2$ exhibits a temperature dependence that is much stronger than that of conventional materials. This feature enables several potential ways for high-sensitivity remote temperature sensing using thermoreflectance imaging, or active reflectance modulation of IR signals. Therefore, the graded $WVO_2$ structure offers a general platform for easy manipulation and processing of IR signals for new radiative and reflective systems. For example, the material platform can achieve strong temperature dependence of reflectivity over broad wavelengths from near-IR to far-IR.

According to one aspect of the technology, an IR material platform is provided that can be used to design and produce a mechanically flexible and power-free thermal IR camouflage, which is beyond the capability of traditional camouflage technology due to its inherent robustness and immunity to drastic temporal fluctuations and spatial variations of temperature. These products can be applied in counter-surveillance and military defense.

A further aspect of the technology is to provide a platform that can be used to create an artificial surface with a counterfeited IR image to fool cameras, regardless of the actual temperature profile on the targets. This IR "decoy" technology could be applied in military defense and counter-terrorism.

Another aspect of the technology is to provide a platform that can be applied to remote temperature sensing by thermoreflectance. The high temperature sensitivity and spatial resolution is beneficial for non-invasive micro-scale analysis in industry, academia, and commerce.

Another aspect of the technology is to provide a material platform that can be used to produce tools with active and fast modulation of IR and terahertz signals, which have strong potential for academia research, non-invasive detection, and wireless communications.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems and methods for producing and using a material platform with programmable infrared emissivity are generally shown. Several embodiments of the technology are described generally in FIG. 1A to FIG. 13B to illustrate the characteristics and functionality of the devices, systems, and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1A:
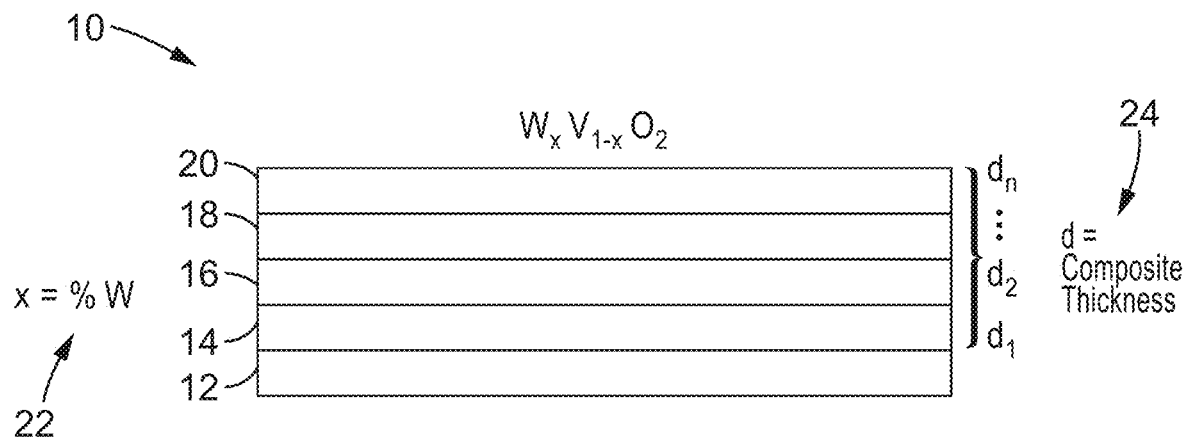
FIG. 1A is a schematic cross-sectional diagram of a programmable thermal radiation platform with graded W-doped $VO_2$ according to one embodiment of the technology.
Figure 1B:
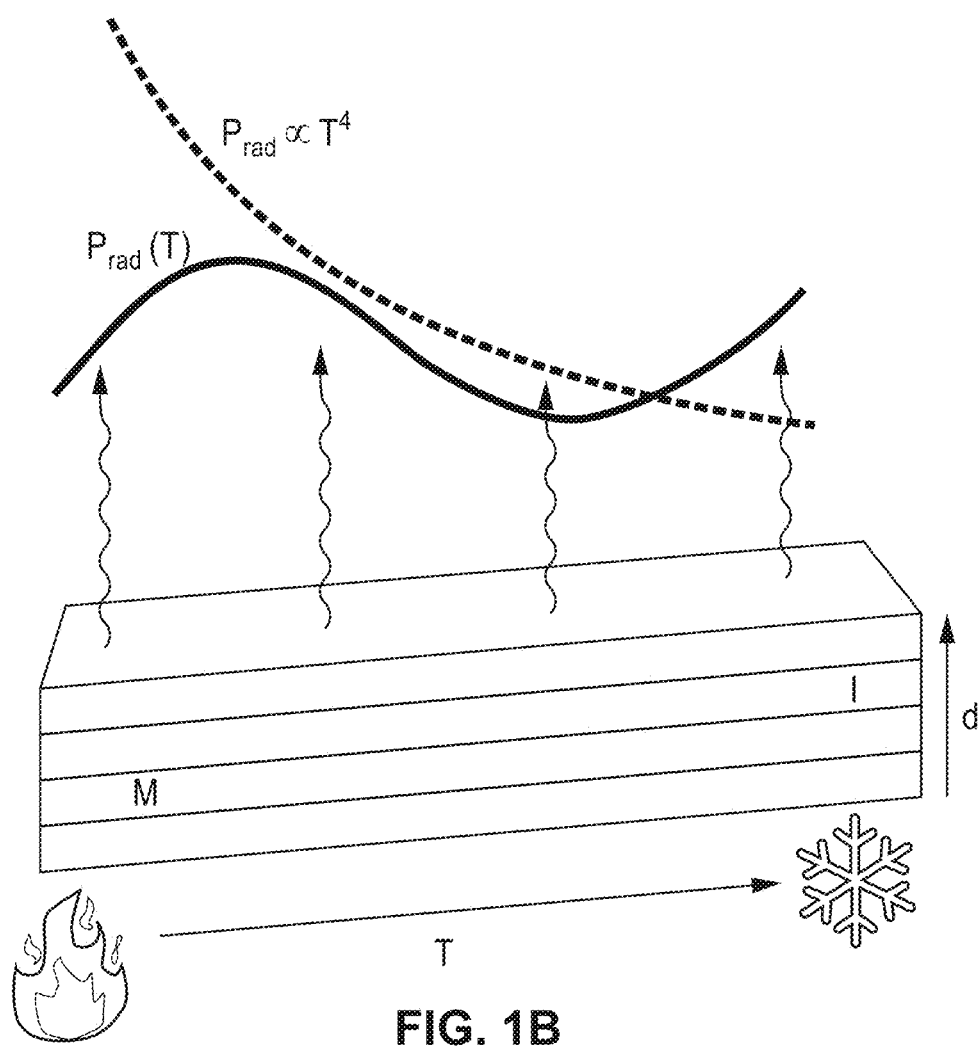
FIG. 1B is a schematic perspective view of structure illustrating the programmable thermal radiation property distinctly different from the $T^4$ law by judicious design of the W doping profile in the graded $WVO_2$ film.

Turning now to FIG. 1A and FIG. 1B, one embodiment of the multilayer platform 10 with tunable infrared emissivity is shown schematically. The platform structure is based on thin films of tungsten-doped vanadium dioxide where the tungsten fraction is judiciously graded across a thickness d that is less than the skin depth of electromagnetic screening. In this embodiment, the platform 10 has a substrate 12 on which multiple layers of $W_xV_{1-x}O_2$ with different W doping levels (x values), forming a graded W-doped film.

The substrate 12 is typically planar and may be rigid such as sapphire or borosilicate glass substrates. However, the platform substrate 12 may be polymeric and flexible and applied to uneven or fabric surfaces.

As seen in FIG. 1A, each successive layer of $W_xV_{1-x}O_2$ has an increasing or decreasing level (i.e. % W) of doping progressing from the base layer 14 to the top layer 20 in this embodiment. For example, the base layer 14 may have a dopant level of x=0%, the second layer 16 may have a dopant level of x=1%, the third layer 18 may have a dopant level of x=2%, and the top layer 20 may have a dopant level of x=3%.

Similarly, other embodiments may have decreasing dopant levels so that the base layer 14 may have a dopant level of x=3%, the second layer 16 may have a dopant level of x=2% and so forth. The dopant quantities in successive levels can be increase or decrease in amounts other than in single units used in this illustration. For example, the units may double (e.g. 2, 4, 6, 8 . . . ) or triple (e.g. 3, 6, 9 . . . ) in successive layers. The increase or decrease 22 may be in fractions of units (e.g. 0.1, 0.2, 0.3 . . . ) or may be exponential (e.g. 2, 4, 8, 16 . . . ).

Each layer also has a thickness ranging from $d_1$ to $d_n$ and the composite has a total composite thickness 24 described as d. The thickness of each layer can be the same or varied. In the embodiment shown in FIG. 1A, the layers can also successively increase or decrease in thickness to illustrate the tuneability of the platform. For example, the base layer 14 has a thickness $d_1$ that may be 26 nm. The second layer 16 may have a thickness $d_2$ of 24 nm that is thinner than the 26 nm of layer 14 and so forth successively decreasing layer by layer to the top layer 20.

Similarly, the pattern of layer thicknesses $d_1 \ldots d_n$ may increase from layer to layer. In that embodiment, the base layer 14 would be the thinnest layer and the top layer would be the thickest layer. Although the composite 10 is illustrated with layers that increase or decrease in thickness by single units, it will be understood that the change in thickness from layer to layer may be in multiple units or in fractions of units or even exponentially.

Finally, the total number of layers forming the composite can also vary from what is shown in FIG. 1A and the number of layers can contribute to the characteristics of the finished platform 10. However, the total composite thickness 24 of all layers is preferably about 100 nm or less.

Accordingly, the platform 10 characteristics can be tuned through the selection of the dopant, dopant quantity, layer dopant percentage progression, layer number, layer thickness and layer thickness progression. For example, the platform can be designed with a W doping profile (x along thickness direction) of $W_xV_{1-x}O_2$, emissivity programed to regulate thermal radiation ($P_{rad}$) for distinctly different behavior from the Stefan-Boltzmann $T^4$ law as illustrated in FIG. 1B.

Figure 2:
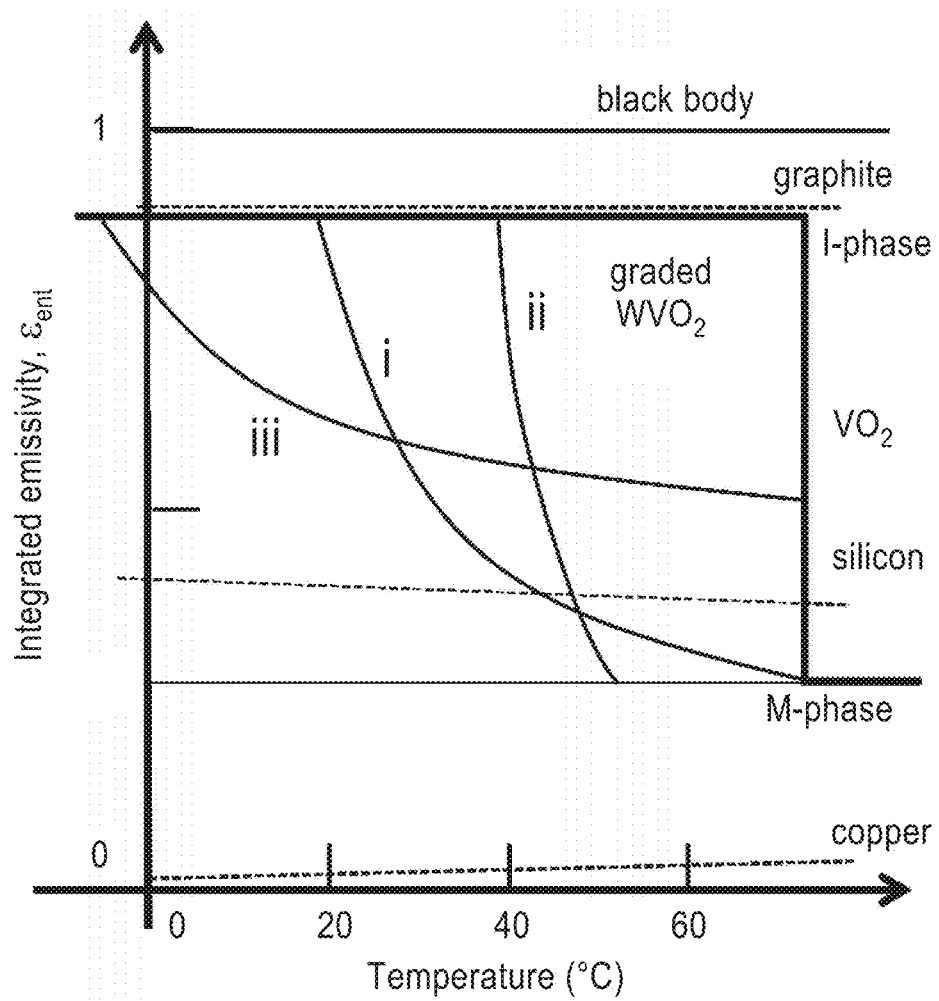
FIG. 2 is a graph of illustrating the nearly arbitrary temperature dependence of integrated emissivity ($\varepsilon_{int}$) using graded W-doped $VO_2$, represented by the three arbitrarily designed emissivity curves denoted by i, ii, and iii. The behavior of typical high, moderate, and low-$\varepsilon_{int}(T)$ materials and of $VO_2$ is also shown for comparison.

As a strongly correlated electron material, vanadium dioxide ($VO_2$) features a well-known, temperature-driven metal-insulator phase transition (MIT) at $T_{MIT}=67°$ C. It takes the insulating (I) phase at $T<T_{MIT}$ and abruptly switches to the metallic (M) phase at $T>T_{MIT}$. In the thermal IR spectral range near room temperature (wavelength between approximately 5 μm and 20 μm), the M phase of $VO_2$ is much more reflective than the I phase, because its plasma energy of free electrons is ~1 eV, significantly higher than that of the thermal IR photons (~0.1 eV). Therefore, much less IR energy is absorbed when $VO_2$ undergoes the phase transition and becomes metallic. According to the Kirchhoff's law of radiation, the spectral emissivity $\varepsilon(\lambda)$ is equal to absorptivity in the IR regime. When averaged for thermal radiation, an abrupt drop in the integrated emissivity ($\varepsilon_{int}$) and hence thermal radiance is thus expected for $VO_2$ at $T=T_{MIT}$, as schematically illustrated in FIG. 2.

Here the thermal radiance per unit solid angle is given by the relation:

$$P_{rad}(T) = \int_0^\infty B(T, \lambda)\varepsilon(\lambda)d\lambda,$$

$$\text{where } B(T, \lambda) = \frac{2hc^2}{\lambda^5}\frac{1}{e^{hc/(\lambda k_B T)} - 1}$$

is the spectral radiance of a black body, $k_B$ is the Boltzmann constant, h is the Planck constant, c is the speed of light, $\lambda$ is the wavelength, and $\varepsilon(\lambda)$ is the spectral emissivity. Conveniently, $T_{MIT}$ of $VO_2$ can be rapidly shifted from 67° C. to lower temperatures, down to temperatures beyond $-100°$ C., by doping with tungsten (W) to form $W_xV_{1-x}O_2$ alloys. The reduction of $T_{MIT}$ follows a rate of d $T_{MIT}(x)/dx \approx -25°$ C./at. % as measured in films and shown in FIG. 3.

Figure 3:
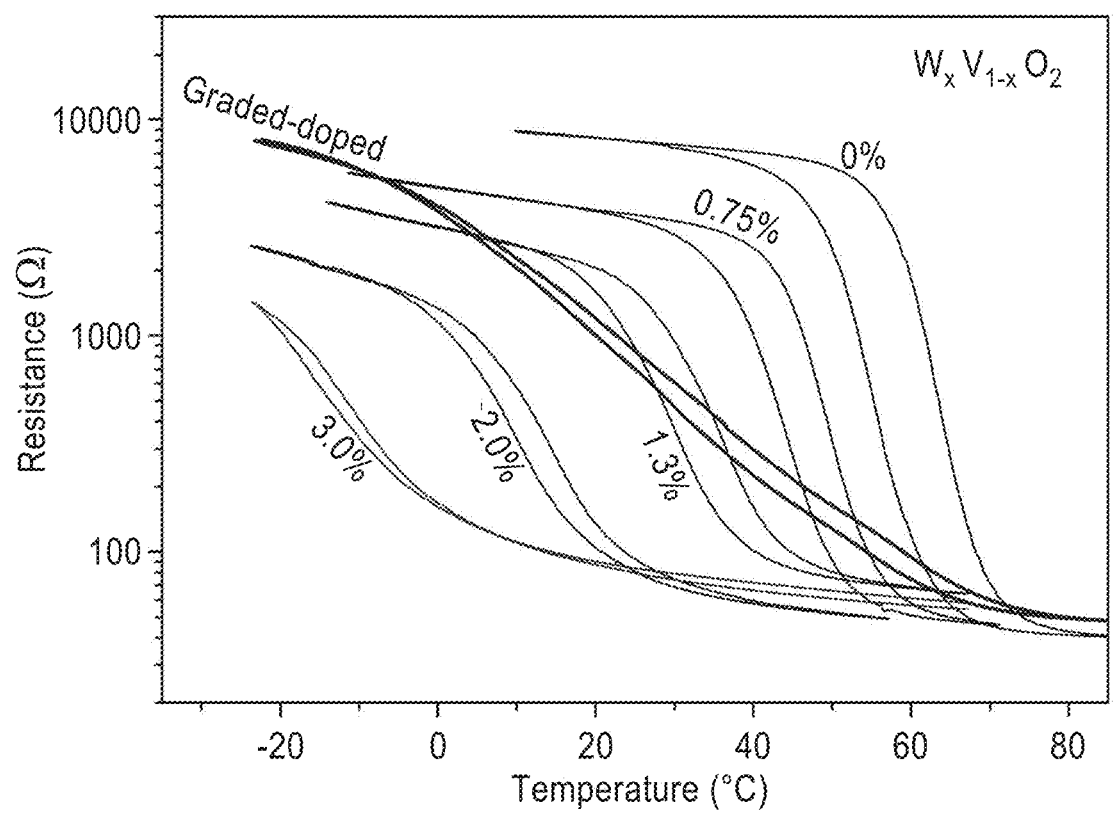
FIG. 3 is a graph of resistance-temperature data of uniformly doped $W_xV_{1-x}O_2$ thin films with different W fractions, measured by standard four-probe method. The abrupt drop in resistivity occurs at the $T_{MIT}$ of each film.

The contrasts in both electrical resistivity and $\varepsilon_{int}$ between the I and M phases are largely retained for low-fraction W doping as shown in FIG. 2 and FIG. 3. However, the abrupt nature of MIT in $W_xV_{1-x}O_2$ at those $T_{MIT}$ values limits any application of the MIT to be within a narrow temperature window around $T_{MIT}$. This window is typically narrower than ~20° C., and outside this window, the material would behave as either a regular insulator On the I phase) or a regular metal (in the M phase) as illustrated in FIG. 3. To overcome this limit, multilayer $W_xV_{1-x}O_2$ films with total thickness less than $\approx 100$ nm, were designed and deposited as schematically shown in FIG. 1A.

Depending on the composition and configuration of W doping, the thermal IR emissivity can be engineered by grading metal (M)-insulator (I) transition as illustrated in the graph of FIG. 2. The nearly arbitrary temperature dependence of integrated emissivity ($\varepsilon_{int}$) is shown using graded W-doped $VO_2$, represented by the three arbitrarily designed emissivity curves denoted by i, ii, and iii. The behavior of typical high, moderate, and low-$\varepsilon_{int}$ materials (graphite, silicon and copper) and of $VO_2$ is also shown for comparison in FIG. 2.

Interlayer diffusion of W was shown to take place during the film deposition and post-deposition annealing. As a result, the multilayer structure becomes a graded W-doped $VO_2$ film, where x varies continuously across the thickness direction as shown in FIG. 1B. The resistance-temperature data of uniformly doped $W_xV_{1-x}O_2$ thin films with different W fractions, measured by the standard four-probe method is shown in FIG. 3. The abrupt drop in resistivity occurs at the $T_{MIT}$ of each film. The resistance of a graded doped $W_xV_{1-x}O_2$ film (curve) is also plotted for comparison, showing that its MIT is spread over a wide temperature range. The lack of kinks and abrupt changes in the electrical sheet resistance of the multilayer film indicates that it becomes a smoothly graded W-doped structure. The graded doping spreads out the MIT from the original narrow temperature window near $T_{MIT}$ to a broad temperature range spanning from $T_{MIT}(x_{max})$ to $T_{MIT}(x_{min})$. The drop in emissivity between the I and M phases becomes no longer abrupt and is also extended to this temperature range. It was seen that it is important to grade the MIT within a thickness less than the skin depth ($\approx 130$ nm) of electromagnetic screening in the M-phase, so that the emissivity for surface radiation can be modulated by the MIT progressing away from the film surface.

Figure 4:
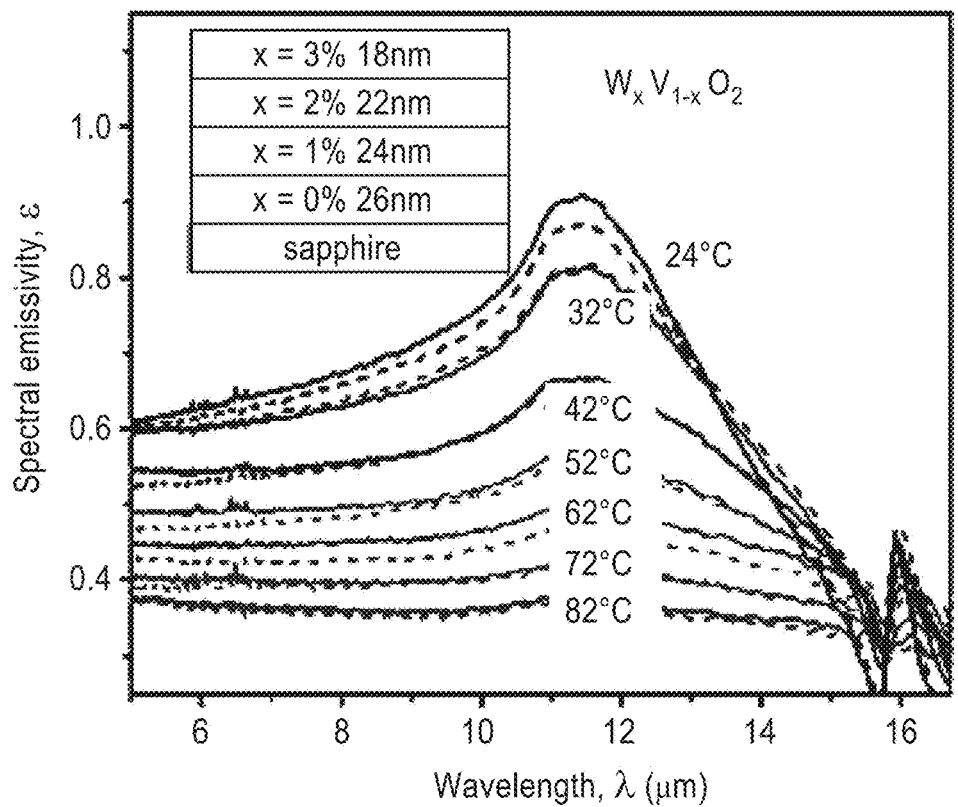
FIG. 4 is a graph of spectral emissivity of a graded $W_xV_{1-x}O_2$ film structure (schematic in inset) measured over a broad range of temperatures, showing a smoothly but rapidly reducing $\varepsilon_{int}$. The solid and dashed curves correspond to data collected during heating and cooling, respectively. The spectral behavior in the long-wavelength region is related to the substrate.

The temperature dependence of $\varepsilon(\lambda)$ of a representative graded $WVO_2$ film was measured using Fourier transform IR (FTIR) spectroscopy and is shown in FIG. 4. Spectral emissivity of a graded $W_xV_{1-x}O_2$ structure was measured over a broad range of temperatures, showing a smooth but rapidly reducing $\varepsilon_{int}$. The solid and dashed curves correspond to data collected during heating and cooling, respectively.

The spectral behavior in the long-wavelength region is also related to the substrate. FTIR-measured thermal IR emissivity spectra of a 60 nm-thick, undoped $VO_2$ film deposited on a sapphire substrate was also evaluated. The observed drop of emissivity in the long-wavelength region was specific to the sapphire substrate and does not appear for (W)$VO_2$ on PE tapes and other substrates.

It can also be seen in the graph of FIG. 2 that the spectral emissivity is integrated with B(T, $\lambda$) over an atmospheric transparency window (8 μm to 14 μm) and divided by the black body integration between the same wavelength limits to obtain $\varepsilon_{int}(T)$. The large reduction in $\varepsilon_{int}$ from $\approx 0.75$ to $\approx 0.35$ over a temperature range of $\approx 50°$ C. (schematic curve in FIG. 2), at a rate of $d\varepsilon_{int}/dT \approx -8\times10^{-3}°$ C.$^{-1}$, is orders of magnitude stronger than that of conventional materials. For example, as schematically shown in FIG. 2, $d\varepsilon_{int}/dT$ near room temperature is about $2\times10^{-5}°$ C.$^{-1}$ for graphite (a high-$\varepsilon_{int}$ material), $-1\times10^{-4}°$ C.$^{-1}$ for silicon (a moderate-$\varepsilon_{int}$ material), and $1\times10^{-4}°$ C.$^{-1}$ for typical metals (low-$\varepsilon_{int}$ materials). This temperature insensitivity of $\varepsilon_{int}$ in conventional materials arises fundamentally from the fact that temperature variation is a small perturbation in energy with respect to typical radiative electronic and phononic processes in solids. The W doping profile can also be designed to be more tightly distributed across the structure to achieve even greater $|d\varepsilon_{int}/dT|$ (curve ii in FIG. 2), but at the cost of a narrower working temperature range.

Therefore, this structure provides a platform where emissivity can be engineered to exhibit nearly arbitrary, strong temperature dependence beyond that of conventional materials. Following the Stefan-Boltzmann law, the thermal radiance from the surface can be regulated to have temperature dependences that are distinctly different from the conventional $T^4$ law, as depicted in FIG. 1B.

Figure 5:
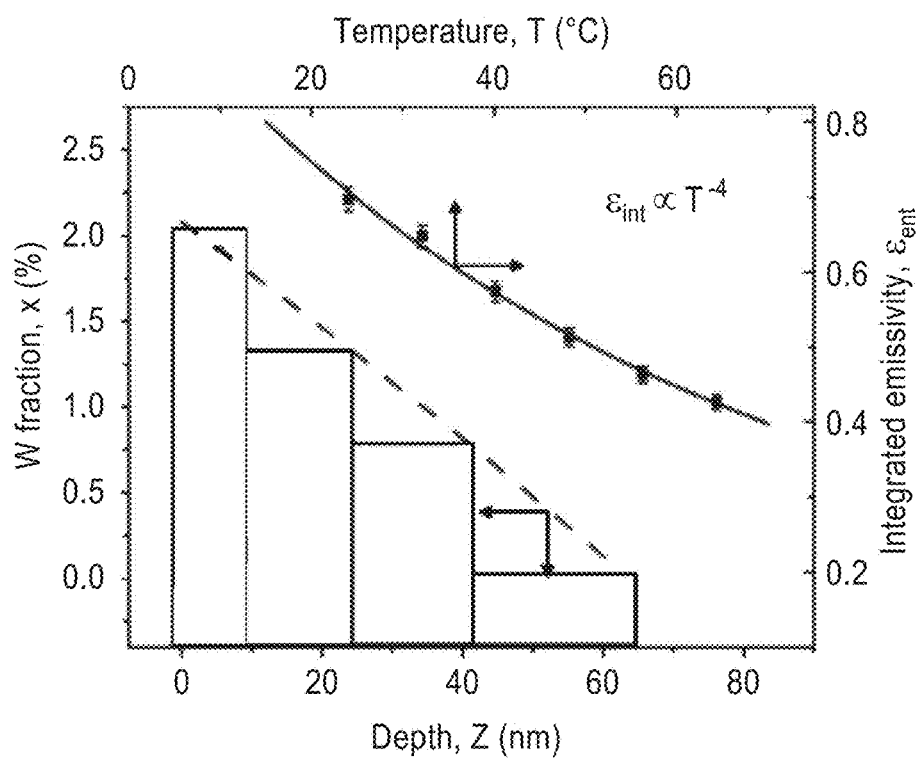
FIG. 5 is a design of a W doping profile x(Z) used to generate the desired $\varepsilon_{int}(T)$ relation. The boxes represent an actual nominal doping profile used in the $WVO_2$ film deposition, and the data points are the experimentally measured $\varepsilon_{int}(T)$ from this film, which agrees well with the desired $\varepsilon_{int}(T)$.

The platform can be engineered with the formulation of a W doping profile that would yield the desired emissivity $\varepsilon_{int}(T)$ as shown in FIG. 5. The W doping profile x(Z) is shown as a dashed line in FIG. 5 that is used to generate the desired $\varepsilon_{int}(T)$ relation (solid line, right-up axes). The boxes represent an actual nominal doping profile used in the WVO$_2$ film deposition, and the data points are the experimentally measured $\varepsilon_{int}(T)$ from this film, which agrees well with the desired $\varepsilon_{int}(T)$.

Exploiting the $\varepsilon_{int}$-regulated thermal radiation, a mechanically flexible and power-free devices can be produced that are inherently robust and immune to drastic temporal fluctuation and spatial variations of temperature.

The present technology is illustrated with embodiments of a mechanically flexible IR camouflage, an IR decoy with programmable features, as well as potential applications in thermo-reflectance imaging and IR-signal modulation. The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality of the methods, a materials platform according to the presented technology comprises a WVO$_2$ thin film with graded W doping and a total thickness of less than about 100 nm was prepared and evaluated.

Thin films were grown on sapphire or borosilicate glass substrates by pulsed laser deposition (PLD). The graded W doping was achieved by sequentially focusing the pulsed laser on a series of WVO$_2$ targets with different W doping ratios. The targets were prepared by mixing WO$_3$ and V$_2$O$_5$ powders with W:V atomic ratio ranging from 0 to 3.0%, then made into 1 inch diameter round discs with a hydraulic press. All thin films were deposited in 5 mTorr O$_2$ environment at 475° C. substrate temperature. The PLD laser energy was set at 321 mJ with 5 Hz pulse frequency. A post-deposition anneal at 475° C. for 30 minutes in the same 5 mTorr O$_2$ environment was performed for all graded doped WVO$_2$ films. The thickness and deposition rate of the thin films were measured by atomic force microscopy and scanning electron microscopy, and the W faction as well as depth profile was characterized by X-ray photoelectron spectroscopy. The structure and composition characterization of the graded W doped WVO$_2$ film is shown in FIG. 4.

Figure 6:
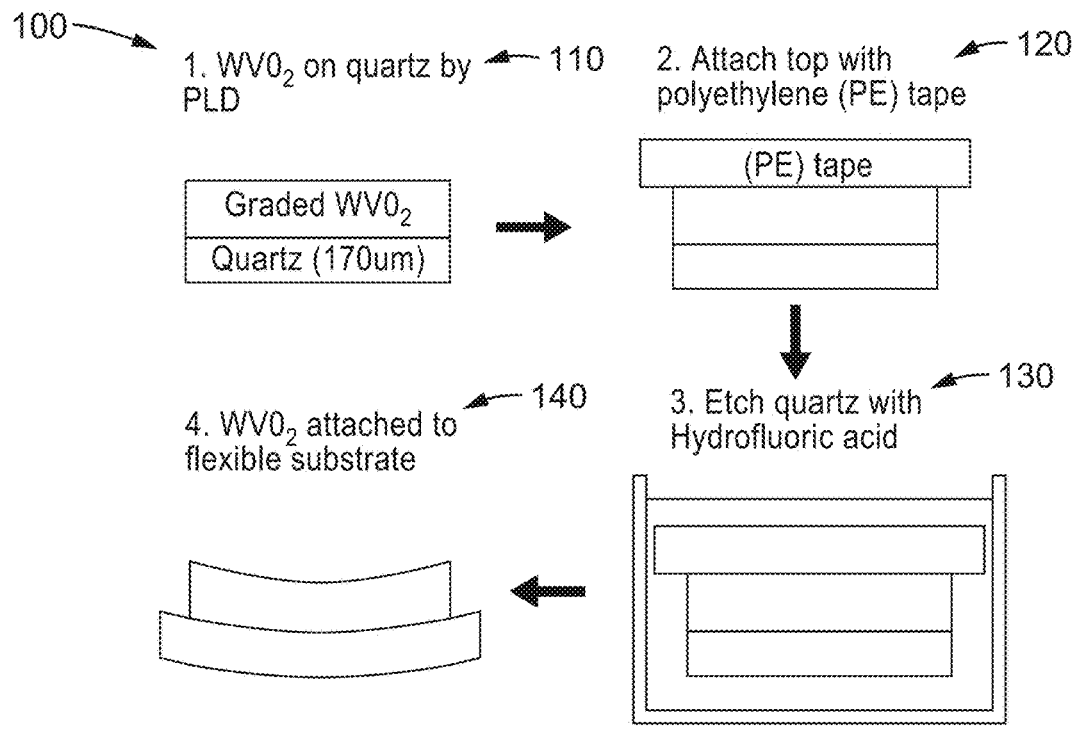
FIG. 6 is a functional block diagram of a method for fabricating a flexible platform where films are grown on quartz substrates and transferred to PE tapes by sticking the $WVO_2$ side to the adhesive tape, and then etching off the original substrate according to one embodiment of the technology.

One embodiment of a method 100 for the preparation of the IR platform on a flexible substrate is shown schematically in FIG. 6. The first step 110 is to grow graded WVO$_2$ thin films on a substrate of quartz or borosilicate glass. The characteristics of the graded WVO$_2$ thin films are determined according to a W doping profile with selected layer number, layer thickness and dopant concentrations.

The second step at block 120 is to transfer the fully formed graded WVO$_2$ thin film and original quartz substrate onto a PE tape substrate by sticking the WVO$_2$ side of the to the adhesive side of the tape. The graded WVO$_2$ thin film is then separated from the quartz or borosilicate glass substrate at block 130 by etching off the 170 μm thick borosilicate glass substrate by dipping it into 49% Hydrofluoric (HF) acid for 5 minutes. The samples with transferred WVO$_2$ are then rinsed in deionized water for 3 minutes and gently blown dry with a N$_2$ gun at block 140 of FIG. 6. The interfacial adhesion has been shown to be strong. No delamination of WVO$_2$ was observed during the wet transfer process, in further contact with water, or with mechanical bending and twisting of the tape in this embodiment. The thickness of the PE tape (default) and the scotch tape was 0.20 mm and 0.08 mm, respectively. The visible color mainly depends on the thickness of the graded WVO$_2$ coating layer. Thicker films will appear blue/purple, while thinner films tend to have brown/yellow color.

Example 2

To illustrate the materials and methods, the design of sub-skin-depth W doping profile (x(Z)) to achieve desired $\varepsilon_{int}(T)$ was demonstrated. To engineer the integrated emissivity, it is necessary to calculate the W doping profile x(Z) that would yield the desired emissivity. This is a nonlinear problem and an accurate solution requires optimization with a large number of parameters (x and thickness of each layer in the W$_x$V$_{1-x}$O$_2$ stack).

Figure 8:
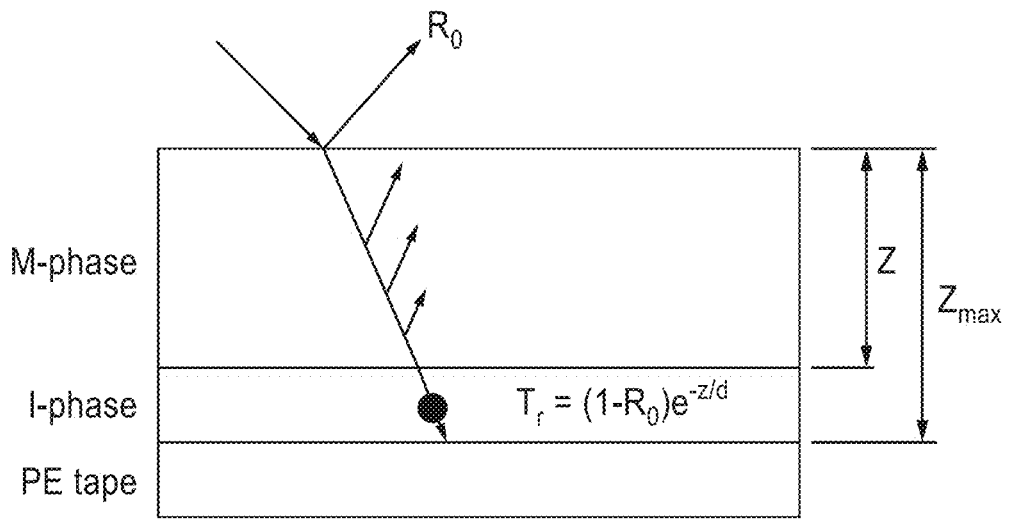
FIG. 8 is a schematic side view of light transmission in a $WVO_2$ film with graded W doping. The W doping fraction (x) goes from high to low from the top to bottom, and the thickness of the metallic phase (Z) increases with temperature. The incident light is partially reflected as it propagates through the metallic phase.

The schematics of light transmission in a WVO$_2$ film with graded W doping is shown in FIG. 8. The W doping fraction (x) goes from high to low from the top to bottom, and the thickness of the metallic phase (Z) increases with temperature. The incident light is partially reflected as it propagates through the metallic phase.

A theoretical model was developed to guide the design of W doping profile (x(Z), where x is W atomic fraction and Z is depth of film) to achieve the desired temperature dependence of emissivity $\varepsilon_{int}(T)$. In the model, it was assumed that x(Z) is a continuous function, and the PE tape at the back side of the layer is 100% absorptive to the IR signals.

As shown in FIG. 8, it is also assumed that the WVO$_2$ layer is smoothly and monotonically graded with $x_{max}$ at the surface of the layer, such that x(Z) is a continuous (rather than step) function. As T increases, the M/I phase boundary moves from the film surface (Z=0) toward larger Z values, until at T=T$_{MIT}$(x$_{min}$) when the entire WVO$_2$ layer becomes metallic, Z reaches the entire thickness of the layer, Z$_{max}$.

Therefore, the input is the known, desired $\varepsilon_{int}(T)$, and the known T$_{MIT}$ (x)=67-25×100x. According to the Kirchhoff's law of radiation, $\varepsilon_{int}(Z)=1-R_{total}(Z)=Tr(Z)=(1-R_0) e^{-Z/d}$, where R$_{total}$ is the reflectance of the incident IR signals, Tr(Z) is the fraction that transmits through the M-phase of the WVO$_2$ layer to reach the PE tape, R$_0$ is the reflectance when Z=0, and d is the skin depth of the M-phase WVO$_2$ to screen the IR signals, and Tr(Z) is the fraction that transmits through the M-phase of the WVO$_2$ layer to reach the PE tape substrate and then absorbed (where it is assumed that the I-phase of the WVO$_2$ layer is completely transparent).

As shown in FIG. 8, the transmission is related to the M-phase thickness following an exponential dependence, Tr(Z)=(1-R$_0$)e$^{-Z/d}$, where R$_0$ is the reflectance when Z=0, and d is the skin depth of the M-phase WVO$_2$ to screen the IR signals.

Setting T=T$_{MIT}$(X), combined with the known $\varepsilon_{int}(T)$ and $\varepsilon_{int}(Z)=(1-R_0) e^{-Z/d} \equiv \varepsilon_{int}^0 e^{-Z/d}$, the following relation is obtained:

$$\frac{dZ}{dx} = d \cdot \frac{d\ln(\varepsilon_{int})}{dx} = 25d \frac{1}{\varepsilon_{int}} \frac{d\varepsilon_{int}}{dT}.$$

The Z(x) profile is then obtained by numerically integrating this differential equation over x. Specifically, for $\varepsilon_{int}(7)$ =CT$^{-4}$, an analytical expression can be reached as $$Z(x) = 4d \times \ln\left(\frac{340 - 25 \times 100x}{\sqrt[4]{C/\varepsilon_{int}^0}}\right).$$

Figure 9:
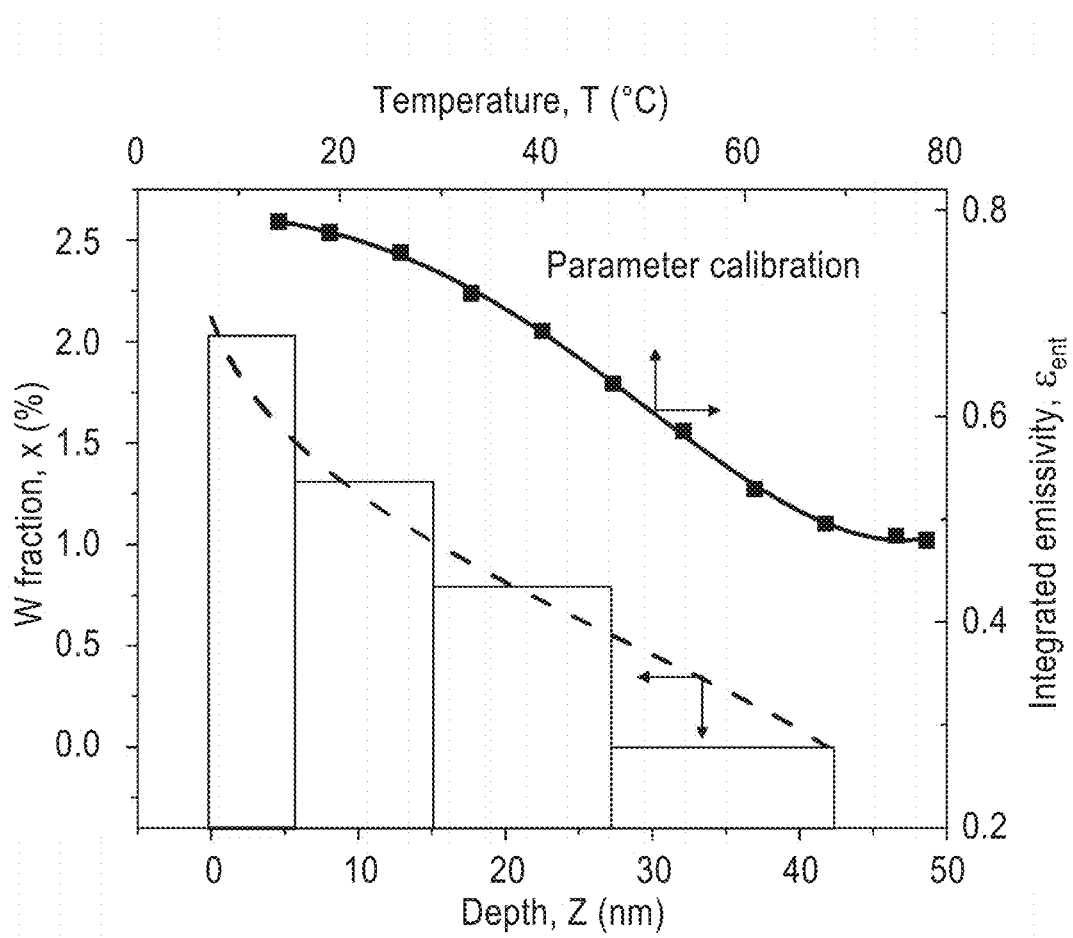
FIG. 9 is a graph for parameter calibration for finding the fitting parameter $R_0$ and d by maximally matching the calculated x(Z) profile (dashed curve) with the experimental nominal W doping profile of the calibration sample.

Here the parameters $R_0$ and d were adjusted to obtain the best fit with the experimental data (x(Z) and $\varepsilon_{int}(T)$) of the calibration sample, as shown in FIG. 9. The fitting parameters $R_0$ and d were found by maximally matching the calculated x(Z) profile (dashed curve) with the experimental nominal W doping profile (bars) of this calibration sample as seen in FIG. 9. By fitting with experiment data, the parameters $R_0$ and d were found to be $R_0=0.2$ and d=96 nm. These values were then used to design x(Z) for the desired $\varepsilon_{int}(T)$ for other samples.

Using the classical electromagnetic wave screening theory, the skin depth of the M-phase $WVO_2$ was estimated to be $\delta=(2\rho/\omega\mu_0)^{-2}$ as approximately 130 nm. Here $\rho=2\times 10^{-6}$ $\Omega$m is the resistivity of M-phase, $\omega=2\pi\cdot 30$ THz is the angular frequency at IR wavelength of ~10 μm, and $\mu_0$ is the vacuum permeability. It was also apparent that the $\varepsilon_{int}$ modulation requires the $WVO_2$ total thickness ($Z_{max}$) to be less than the skin depth $\delta$ (130 nm), otherwise the $\varepsilon_{int}$ would saturate when the M/I interface (Z) reaches $\delta$ and can be no longer be controlled by the unfinished MIT as temperature increases.

This theoretical model and analytical differential equations were confirmed to be reliable in designing the W doping profile x(Z) to meet the requirement of various $\varepsilon_{int}(T)$ functions in differential industrially application scenarios.

Figure 10A:
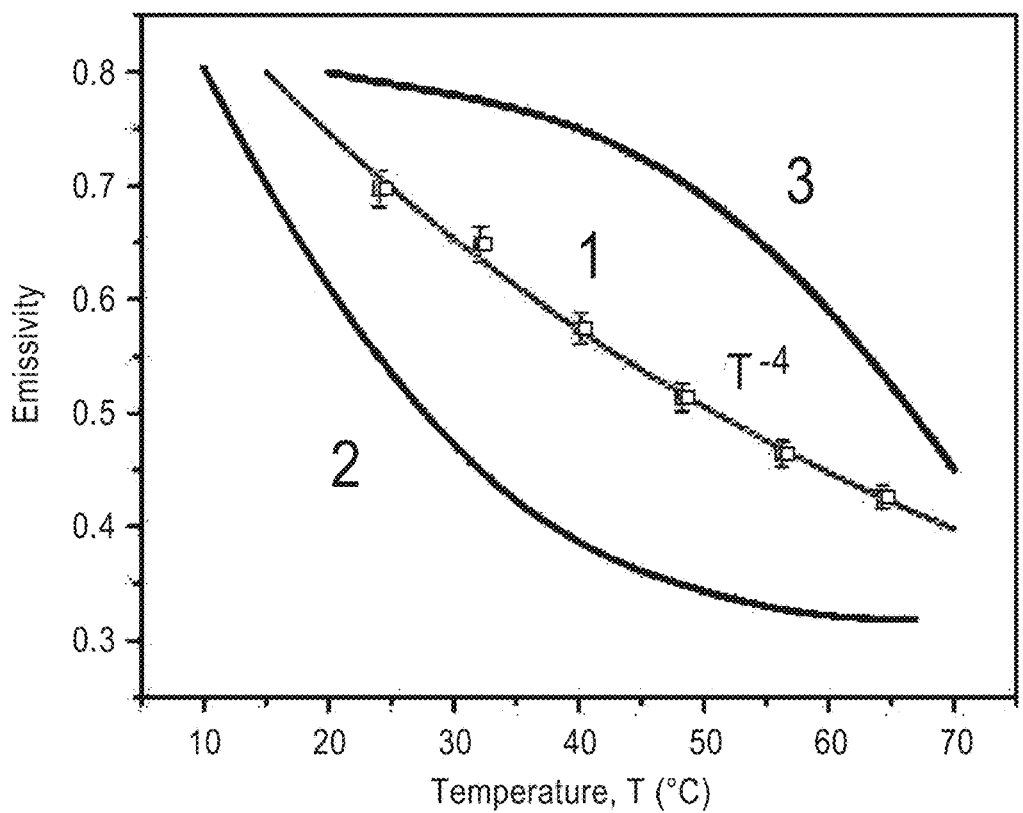
FIG. 10A is a graph of three desired emissivity ($\varepsilon_{int}(n)$) curves for determining a W doping profile. The dots are experimentally measured data for the desired $T^4$ dependence.
Figure 10B:
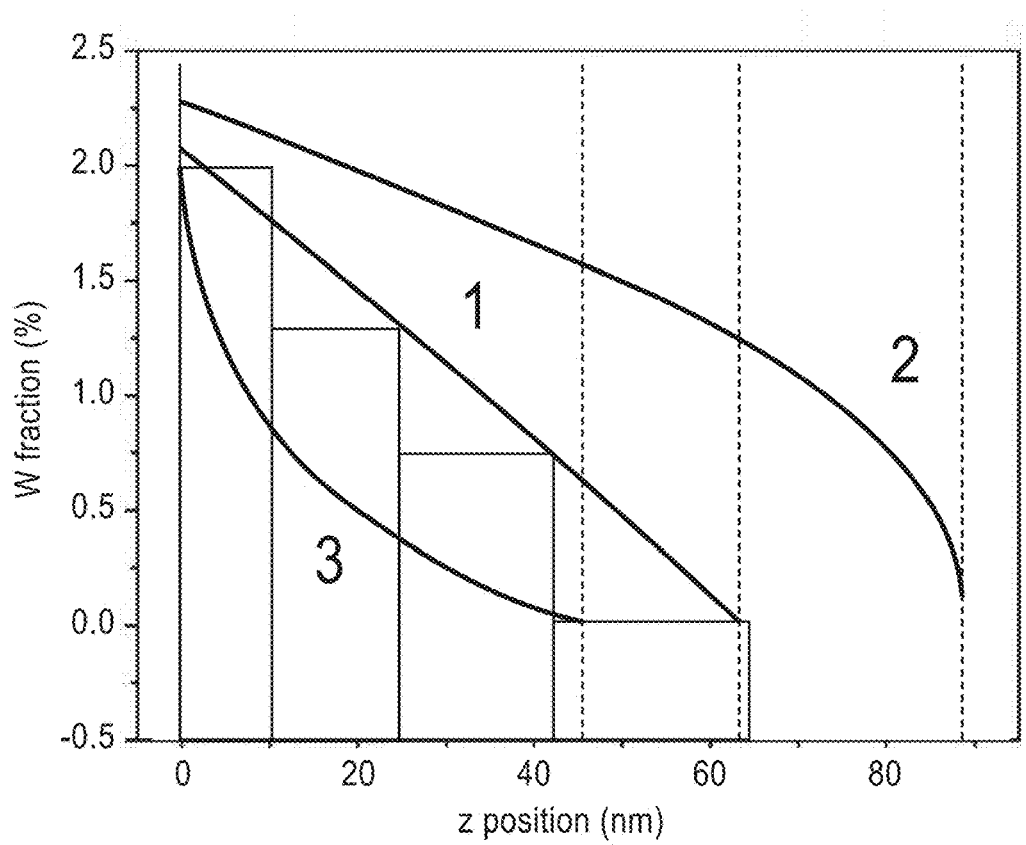
FIG. 10B depicts the design of W doping profile x(Z) to generate the desired $\varepsilon_{int}(T)$ relation. The boxes represent an actual nominal doping profile used in the $WVO_2$ film deposition, and the data points are the experimentally measured $\varepsilon_{int}(T)$ from this film, which agrees well with the desired $\varepsilon_{int}(T)$.

Examples of W doping profile design are demonstrated in FIG. 10A and FIG. 10B. Three desired $\varepsilon_{int}(T)$ curves, including one being the $T^4$ dependence, are shown in FIG. 10B where the dots are the experimentally measured data for the desired $T^4$ dependence. The three W doping profile curves were calculated using the model and plotted in FIG. 10B. In FIG. 10B, the vertical dashed lines are the total thickness of the $WVO_2$ layers in each design. The bars are the nominal W doping profile used in $WVO_2$ deposition to mimic the designed x(Z) in the case 1 ($\Sigma_{int}(T)\sim T^{-4}$) of FIG. 10A. After the W diffusion, the experimental doping would become even closer in profile to the designed one (line 1). Note that the $WVO_2$ sample designed in FIG. 10A and FIG. 10B are distinct from the one used for the calibration of parameters in FIG. 9, with different $\varepsilon_{int}(T)$ dependencies.

To design the profile, the calculated x(Z) profile needed to achieve the three desired $\varepsilon_{int}(T)$ dependences shown in FIG. 10A that are labeled 1, 2, and 3. For example, for the sample 1 where $\varepsilon_{int}(T)\sim T^{-4}$ (line 1 in FIG. 10A), the x(Z) was designed to be the curve 1 in FIG. 10B.

The $WVO_2$ films were prepared with a nominal W doping profile shown as the vertical bars with scaled dopant concentrations and thicknesses in FIG. 10B, to mimic the theoretically designed profile x(Z). The resultant performance of the experimentally measured $\varepsilon_{int}(T)$ of this sample (data points in FIG. 10A) was in good agreement with the target $\varepsilon_{int}(T)\sim T^{-4}$. The quantitatively successful design of W doping profile is shown in FIG. 10A and FIG. 10B, using the fitting parameter obtained from a different sample (FIG. 9), demonstrated the consistency and reliability of the model.

Example 3

To demonstrate a practical application of the graded $WVO_2$ platform, mechanically flexible thermal IR camouflage was fabricated and tested. With judicious design of the doping density and thickness in each layer of $WVO_2$, $\varepsilon_{int}(T)$ of the graded doped $WVO_2$ film can be programmed into a $\sim 1/T^4$ temperature dependence as described in Example 2. When the dopant profile x(Z) (i.e. concentration x and thickness of each layer) was calculated, the resulting graded doped $WVO_2$ film exhibited an $\varepsilon_{int}$ that depended on temperature following $\approx 1/T^4$.

Figure 7:
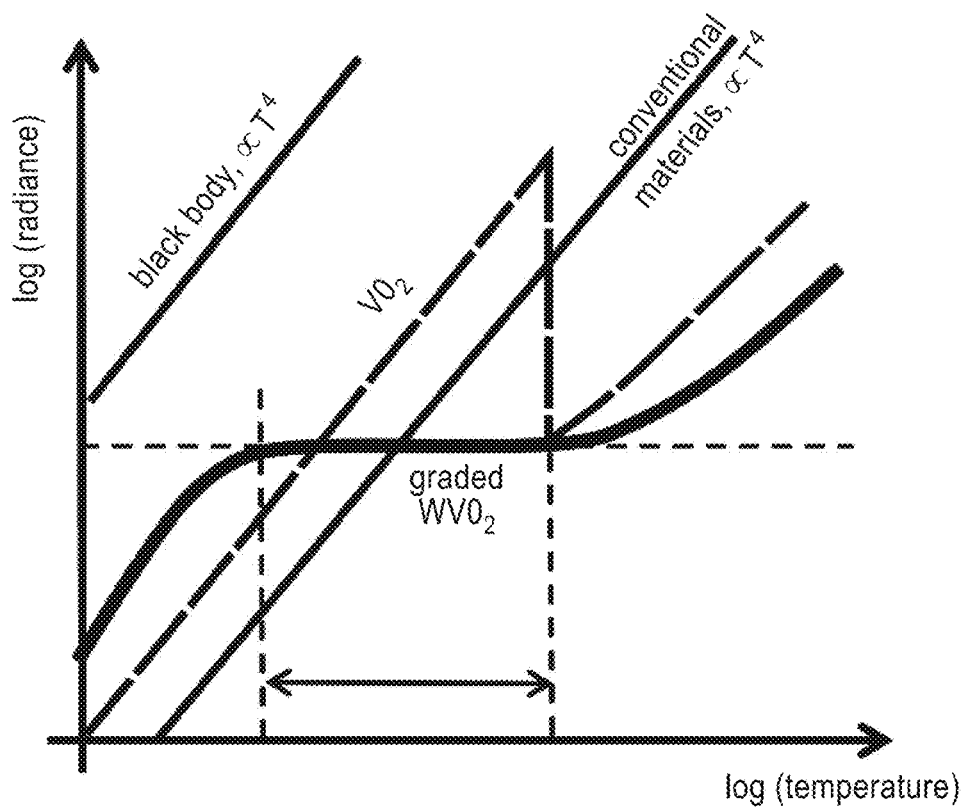
FIG. 7 is a graph depicting constant thermal radiance over a wide range of temperature from the graded $WVO_2$ based IR camouflage, in stark contrast to the Stefan-Boltzmann $T^4$ law from conventional materials.

As illustrated in FIG. 7, a constant thermal radiance over a wide range of temperatures can be observed from the IR camouflage, in stark contrast to the Stefan-Boltzmann $T^4$ law from conventional materials. Consequently, despite significant variation of actual temperature within the range of stabilized $P_{rad}$, the platform structure would appear to have a constant IR temperature ($T_{IR}$) when imaged by an IR camera, thus achieving the function of an IR camouflage.

Figure 11:
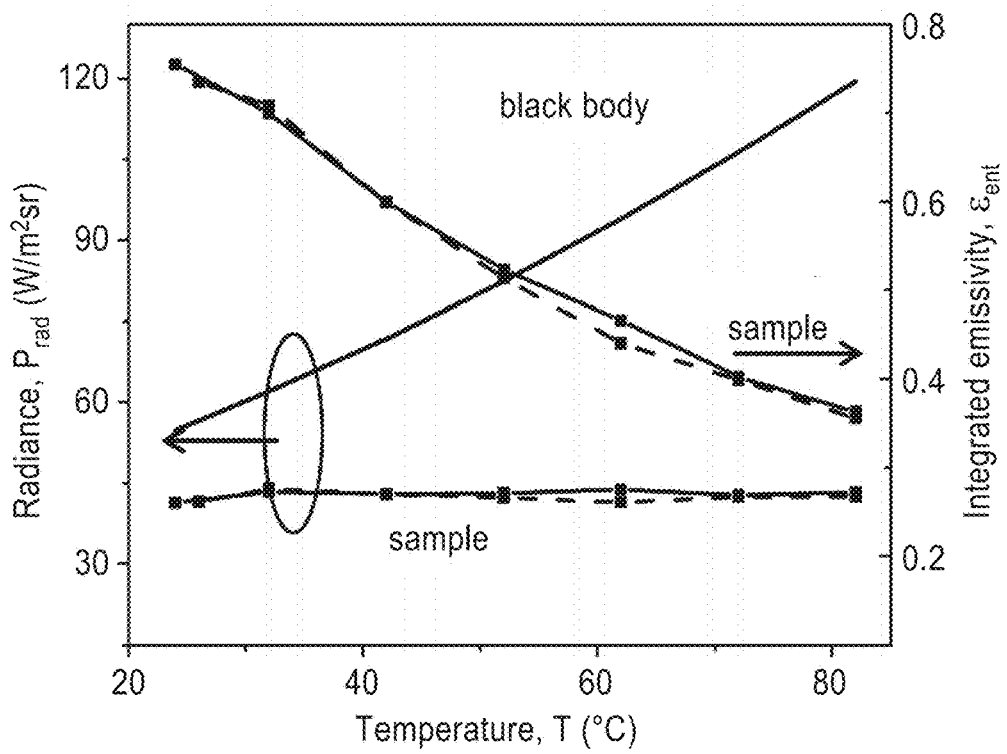
FIG. 11 is a graph of the thermal radiance and integrated emissivity of the film as a function of temperature, showing that the negative temperature coefficient of emissivity counteracts the $T^4$ law to yield a temperature-independent thermal radiation power. The solid and dashed curves are for measurements during heating and cooling, respectively.

When the $1/T^4$ dependence of $\varepsilon_{int}(T)$ is multiplied with the Stefan-Boltzmann $T^4$ relation of a black body, the T-independent thermal radiance $P_{rad}$ is provided as shown in FIG. 11. It can be seen from FIG. 11 that the thermal radiance and integrated emissivity of the film as a function of temperature, demonstrates that the negative temperature coefficient of emissivity counteracts the $T^4$ law to yield a temperature-independent thermal radiation power. The solid and dashed curves in FIG. 11 are for the measurements taken during heating and cooling, respectively.

The constant $P_{rad}$ over a temperature range over 50° C. near room P temperature invalidates the assumption of T-dependent the principle that is the foundation of conventional IR imaging. As such, the platform structure would appear to have a constant IR temperature ($T_{IR}$) when imaged by an IR camera, despite the reality that its actual temperature ($T_{actual}$) may vary widely. Unlike low-emissivity camouflage coatings that rely on reflection signals from a confinement and thus limited to indoor scenarios, the IR camouflage based on graded $WVO_2$ will fool the camera by manipulating thermal radiation from the target itself, making it ideal for outdoor applications.

Samples prepared following this dopant profile design and the wet etch-transfer method of FIG. 6, provided graded $WVO_2$ films that were transferred from the growth substrate onto a polyethylene (PE) tape. As the total thickness of the $WVO_2$ film is less than 100 nm, the $WVO_2$/tape structure could be bent to curvatures exceeding 10 $cm^{-1}$ without degrading its camouflage performance. The mechanical flexibility combined with the angular-independence of emissivity allowed the camouflage to be easily applied as a tape onto non-flat surfaces, with minimal or no impact to the performance.

No noticeable degradation in camouflage properties or change in surface morphology was detected after up to 100 heating/cooling cycles through the working temperature range (15° C. to 65° C.), demonstrating good reliability of the film.

The angular independence of performance of the camouflage was also demonstrated. IR Images of three identical samples attached to different positions of a temperature-biased surface were viewed from different angles. The regions covered by the samples showed a similar display as the background and remained camouflaged from IR detection, regardless of the local temperature and viewing angle.

Performance of the graded doped $WVO_2$ camouflage on surface with curvature was also evaluated. Two copper rods wrapped by high emissivity coating and three identical sample pieces, respectively were IR imaged under a temperature gradient from 25° C. to 60° C. The samples demonstrated good camouflage behavior at different local temperatures, despite the strain and bending curvatures. The strain of the camouflage in the evaluation was estimated to be around 0.004 to 0.01, and the bending curvature radius was ~0.25 cm.

A series of experiments were conducted to test the performance of the camouflage in different settings. The first was a demonstration of living body camouflage using a finger where the tip was covered by the camouflage and imaged with an IR camera. In contrast to the exposed skin control, the part covered by the camouflage displayed a $T_{IR}$ similar to the environment, concealing the fingertip from IR detection.

Apart from a conventional application as a living body camouflage, the disclosed structure has the inherent, unique advantage to cover up objects with large spatial variation (VT) or abrupt temporal fluctuations (dT/dt) of temperature. In this demonstration, a copper plate coated with high-emissivity platform was thermally biased with the actual temperature ($T_{actual}$) varying from 25° C. to 65° C. Three identical $WVO_2$ camouflages were placed at different positions of the plate that have distinct local temperatures. The regions underneath the camouflages were simultaneously masked from IR detection regardless of the different local temperatures and high thermal gradient. Compared to using multiplexing to address the spatial temperature variation in conventional camouflages, the graded $WVO_2$ design offers a much simpler, monolithic, power-free, and tetherless approach.

The camouflage platform was also shown to be inherently immune to abrupt temperature fluctuations. A heater membrane was partly covered by the graded $WVO_2$ film transferred onto a high-emissivity PE tape (sample), and the rest of the membrane and was covered by the high-emissivity PE tape alone (control). It was observed that the temperature of the plate shoots up rapidly when a current pulse passes through the heater. The IR camera caught a temperature spiking up to 65° C. from the control surface within less than 2 seconds, while the camouflaged surface stayed at a nearly constant $T_{IR}$ of 20° C. irrespective of the heat pulse.

The detected $T_{IR}$ was plotted as a function of time and showed a nearly total immunity to the temperature surge. The platform camouflaging the heater plate with drastic temperature surge, showed an immunity to dT/dt as the actual temperature of the camouflage rose rapidly by the heating pulse, while the IR temperature of the camouflage stayed nearly flat.

This immunity is a substantial advantage over the strategy of adjusting the emissivity using a feedback loop in conventional camouflages, as the latter typically has a response time over seconds and would have the object exposed to detection during the response lagging time.

Example 4

To demonstrate another unique function of the platform, thermal IR "decoys" using the platform structure were fabricated and tested. The $WVO_2$ thin films were grown on borosilicate glass and were transferred onto PE tapes by sticking the $WVO_2$ side to the adhesive side of the tape, and then etching off the 170 μm thick borosilicate glass by dipping into 49% Hydrofluoric (HF) acid for 5 minutes. The samples with transferred $WVO_2$ films were then rinsed in deionized water for 3 minutes and gently blown dry with a $N_2$ gun as illustrated in FIG. 6.

A decoy is different from the IR camouflage in that the decoy not only passively conceals the real thermal activity of the object from an IR camera, but also intentionally fools the camera with a counterfeited $T_{IR}$ image that is independent of $T_{actual}$ distribution and fluctuation. That is, to create a robust thermal radiative pattern $T_{IR}(X,Y,Z)$ on a surface that has arbitrary actual temperature distribution $T_{actual}(X, Y, Z, t)$, where X, Y, and Z are the coordinates of the surface and t is time. Because the overall emissivity of the graded $WVO_2$/tape system is the combined effect of both the $WVO_2$ film and the tape substrate, by using different doping profiles for the graded $WVO_2$ films that are transferred onto different tapes, $T_{IR}$ of the camouflage can be designed to take distinct values to meet different decoy requirements.

Figure 12:
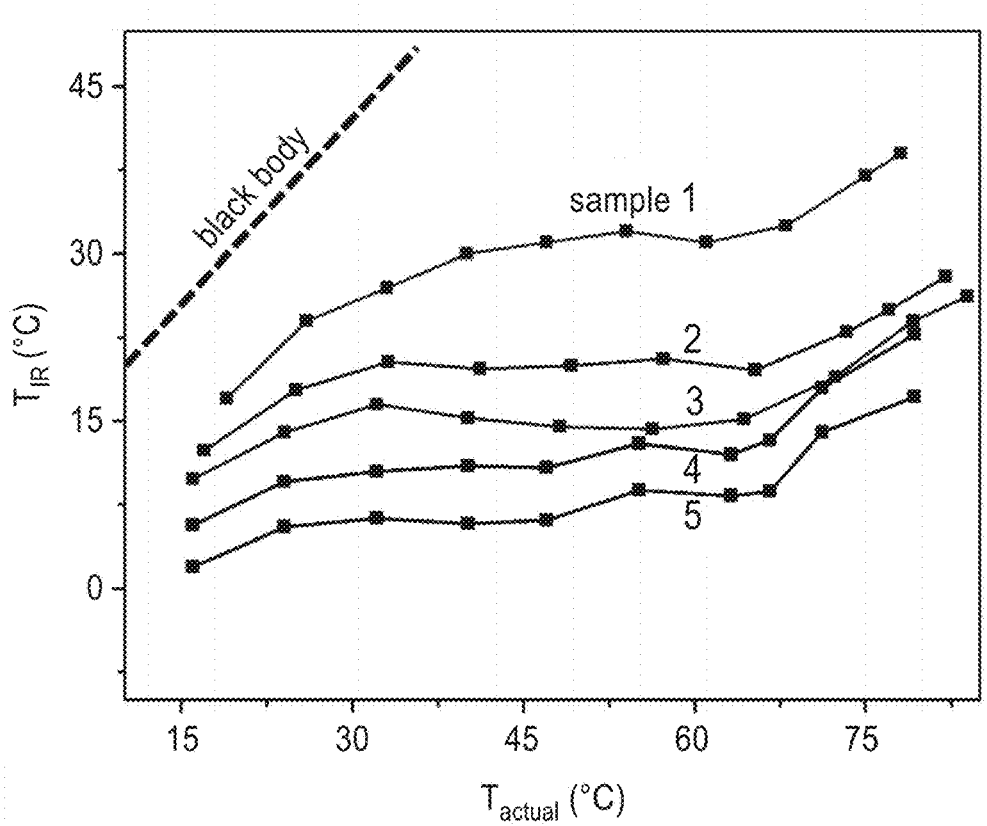
FIG. 12 is a graph of IR temperature ($T_{IR}$) versus actual temperature ($T_{actual}$) of five flexible IR decoy structures, where the graded $WVO_2$ configuration is designed to yield $T_{actual}$-independent, but different, values of desired $T_{IR}$ within the working range of $T_{actual}$.

A series of flexible $WVO_2$/tape samples were prepared for evaluation with different doping and layer thickness configurations as detailed in Table 1 to illustrate the adaptability of the platform and methods. IR temperature ($T_{IR}$) versus actual temperature ($T_{actual}$) of five flexible structures, where the graded $WVO_2$ configuration is designed to yield $T_{actual}$-independent, but different, values of desired $T_{IR}$ within the working range of $T_{actual}$ is shown in FIG. 12. It can be seen in FIG. 12 that, despite $T_{actual}$ varying widely from room temperature to 70° C., the samples all exhibit a nearly constant $T_{IR}$ within the $T_{actual}$ range, whereas $T_{IR}$ is designed to be equal to any desired value in the range of 5° C. to 30° C.

As a proof of concept, a working decoy was created by applying a pattern with one platform structure of constant $T_{IR}$ 5° C., a second structure at $T_{IR} \approx 15°$ C., and a third structure at $T_{IR} \approx 25°$ C., regardless of $T_{actual}$ varying from room temperature to 65° C., 50° C., or 35° C. The three samples were all 1×1 cm² in size. The acquired IR images of the pattern showed a stable IR temperature reading, regardless of the change in $T_{actual}$.

The IR images and videos were captured by a FLIR ONE infrared camera. To avoid reflection signals from the camera and the surrounding area, the default viewing angle was set as 15° instead of normal incident direction, and the experiments were performed in an open-area outdoor environment under clear sky or with little clouds. The temperature was controlled by the same thermal stage used in the FTIR measurements.

When taking an IR image, the camera measures the incident thermal radiation $P_{rad}$, and gives the temperature reading ($T_{IR}$) assuming a constant emissivity for the target ($\varepsilon_0$=0.90). The relationship can be described by the equation: $\varepsilon_0 \sigma T_{IR}^4 = P_{rad}$. The $T_{IR}$ was then plotted as a function of actual temperature ($T_{actual}$) to demonstrate the camouflage performance.

Such decoying information can also be encoded during the film deposition by laterally patterning the composition and thickness of the graded $WVO_2$ film, allowing fabrication of a monolithic and lithographically manufacturable decoy material. Monolithic decoys were prepared by encoding the decoy pattern during the film deposition, by adding an extra layer of $W_{0.03}V_{0.97}O_2$ in areas that needed colder IR temperatures ($T_{IR}$=10° C. to 15° C.), while the rest was designed to be at higher $T_{IR}$=25° C. to 30° C. The performance showed the $T_{actual}$-independent $T_{IR}$ images of the structure to be consistent with the design.

While these features greatly expand the application of radiative camouflage to inhomogeneous and dynamic environments as well as IR decoying, they also inspire novel device concepts based on reflection or on the transmission of IR signals. As expected, over the broad spectral range from near-IR (down to the plasma wavelength≈1.2 μm) to the far-IR, the reflectivity of the graded $WVO_2$ films exhibit a temperature dependence that is much stronger than that of conventional materials. This feature enables potential ways for high-sensitivity remote temperature sensing using thermoreflectance imaging, or active reflectance modulation of IR signals. Therefore, the graded $WVO_2$ structure offers a general platform for unprecedented manipulation and processing of IR signals for novel radiative and reflective systems.

Example 5

Besides emissivity engineering for application of radiative camouflage and IR decoying, the materials platform can also be utilized to develop new device designs based on the strong capability for modulating reflection and transmission of the IR signals. This manipulation capability is not just limited to the atmospheric transparency window spectra range (about 8 µm to about 14 µm), rather it extends from near IR (down to plasma wavelength about 1.2 µm) all the way to the far IR region. The temperature dependence of the reflectivity is much stronger than that of conventional materials.

Figure 13A:
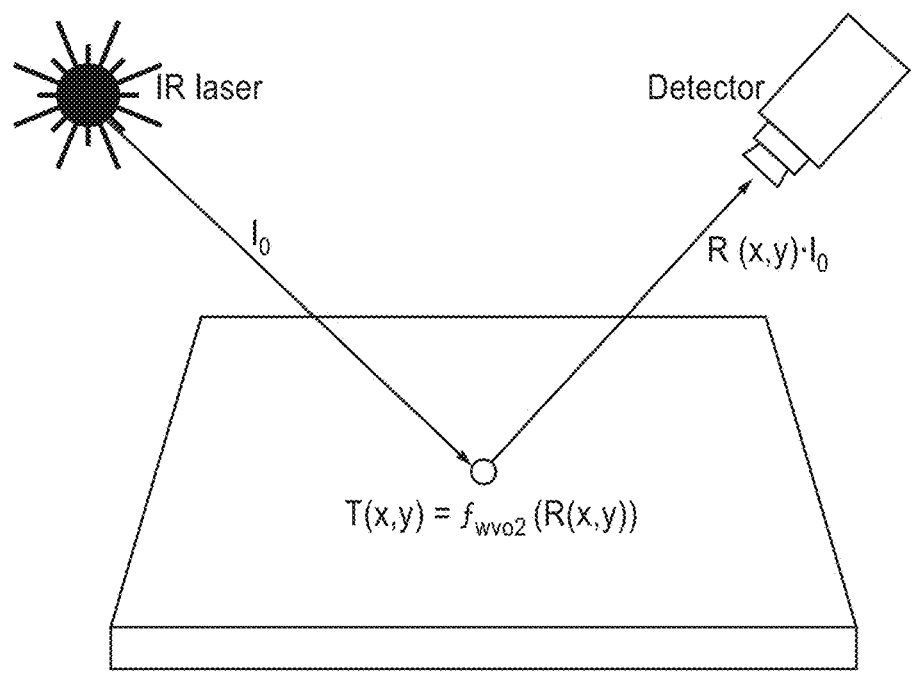
FIG. 13A is a schematic of laser thermoreflectance imaging based on a $WVO_2$ materials platform showing the basic imaging principles.

The ability to design a platform with a reflectivity with strong temperature dependence and flexible tunability makes the $WVO_2$ material platform a promising candidate for high performance thermoreflectance imaging. Thermoreflectance imaging is a widely used remote temperature sensing technique, and the basic working principles are shown in FIG. 13A. By scanning a laser beam with fixed intensity $I_0$ on the target surface and measuring the reflected signal IR, the reflectivity $R=I_R/I_0$ can be obtained as a function of position (x,y). Based on the known relationship of R(T) in the surface materials, the reflectivity distribution R(x,y) can be used to derive the temperature distribution T(x,y), thus enabling remote mapping of the surface temperature.

Compared to conventional thermal imaging methods based on IR radiation, the thermoreflectance imaging technique has two main advantages. First, with focused laser probing on each local spot, the spatial resolution is much higher than that of conventional thermal imaging methods, which are limited by the infrared wave diffraction. Current state-of-the-art thermoreflectance imaging can achieve resolution beyond 200 nm, making it very useful for non-invasive microanalysis of temperature distributions. Consequently, this technique is not only widely employed in academic research to probe microscale thermal features but is also industrially applied to examine circuit lines and detect thermal defects in microelectronic devices production.

Second, thermoreflectance imaging is especially useful for accurate temperature detection on low-temperature targets. In conventional thermal imaging approaches, the temperature is determined by measuring the radiation signal from target surface, which dramatically decreases with lowered temperature. Therefore, targets with low temperatures (such as that near or below room temperature) have a significantly reduced signal-to-noise ratio, causing large errors in the temperature reading. In contrast, the disclosed thermoreflectance method relies on an external signal source, and the accuracy is not affected by this factor.

Figure 13B:
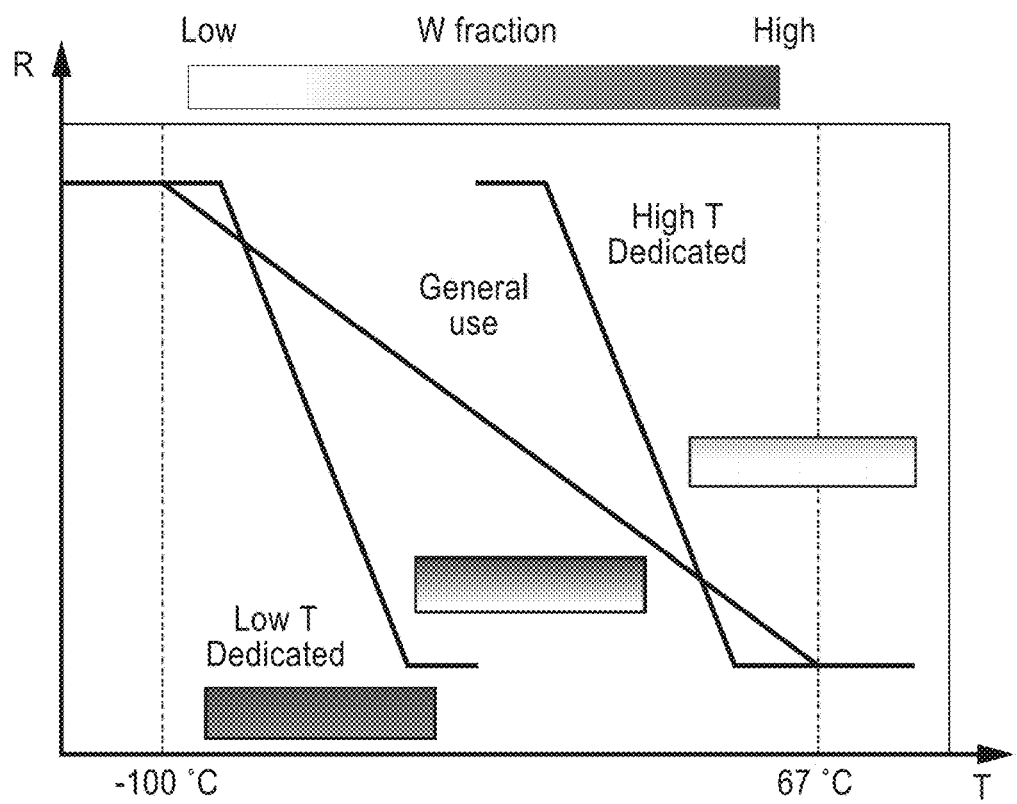
FIG. 13B is a graph demonstrating the flexibility of design of the R(T) relationship by W fraction profile engineering. By judiciously designing the W doping fraction and depth distribution, a nearly linear R(T) dependence can be achieved in desired working temperature range to meet the requirements in various scenarios of dedicated High T, dedicated Low T and general use.

The $WVO_2$ materials platform can be readily embodied in this technology, either by thermally attaching the product fabricated on thin flexible membrane, or by directly depositing the graded W doped $WVO_2$ to the target surface. By judiciously designing the W doping fraction and depth distribution, a nearly linear R(T) dependence can be achieved in desired working temperature ranges to meet the requirements in various scenarios, as shown in FIG. 13B. For cases with dedicated application in a small temperature region, a high thermoreflectance coefficient $>10^{-2}$/K can be expected, which is approximately 2 orders of magnitude higher than conventional materials and can greatly improve the temperature sensitivity of the detection. By combining $WVO_2$ with a wide distribution of W ratio, an R(T) curve with temperature dependence in a broad temperature range can also be designed, enabling applications in general conditions.

From the description herein, it will be appreciated that the present disclosure encompasses multiple implementations of the technology which include, but are not limited to, the following:

A controllable emissivity film, comprising a $WVO_2$ thin film with graded W doping and a total thickness of 100 nm or less.

The film of any preceding or following implementation, further comprising a substrate coupled to the $WVO_2$ thin film.

The film of any preceding or following implementation, further comprising removing the final graded doped $WVO_2$ thin film from the substrate; and coupling the film to a mechanically flexible substrate.

The film of any preceding or following implementation, wherein the $WVO_2$ thin film comprises a composite of multiple film layers, each of the layers having a thickness and a dopant percentage.

The film of any preceding or following implementation, wherein the multiple film layers have progressively decreasing thicknesses from a top surface to a bottom surface of the $WVO_2$ thin film.

The film of any preceding or following implementation, wherein the multiple film layers have progressively increasing thicknesses from a top surface to a bottom surface of the $WVO_2$ thin film.

The film of any preceding or following implementation, wherein the multiple film layers have progressively decreasing dopant percentages from a top surface to a bottom surface of the $WVO_2$ thin film.

The film of any preceding or following implementation, wherein the multiple film layers have progressively increasing dopant percentages from a top surface to a bottom surface of the $WVO_2$ thin film.

The film of any preceding or following implementation, wherein the dopant percentages of the layers from the top surface to the bottom surface decrease from 3% dopant to 0% dopant.

The film of any preceding or following implementation, wherein the dopant percentages of the layers from the top surface to the bottom surface increase from 0% dopant to 3% dopant.

A method for synthesizing controllable emissivity thin films, the method comprising: (a) applying a base layer of $W_xV_{1-x}O_2$, with a first doping level x to a substrate; (b) applying a second layer of $W_xV_{1-x}O_2$, with a second doping level x to a top surface of the base layer; and (c) annealing the deposited films to form a final graded doped film of a total thickness of 100 nm or less.

The method of any preceding or following implementation, further comprising applying a third layer of $W_xV_{1-x}O_2$, with a third doping level x to a top surface of the second layer; and applying additional layers of $W_xV_{1-x}O_2$ consecutively to form the final graded doped film.

The method of any preceding or following implementation, further comprising removing the final graded doped thin film from the substrate; and coupling the film to a mechanically flexible substrate.

The method of any preceding or following implementation, wherein the annealing comprises baking in $O_2$ environment.

A method for fabricating an infrared camouflage the method comprising: (a) selecting a background infrared temperature ($T_{IR}$) between about 5° C. to about 30° C.; (b) fabricating a $WVO_2$ thin film with graded W doping and a total thickness of 100 nm or less with a surface $T_{IR}$ that matches the selected background infrared temperature ($T_{IR}$).

The method of any preceding or following implementation, wherein the fabrication of the $WVO_2$ thin film with graded W doping comprises: (a) applying a base layer of $W_xV_{1-x}O_2$, with a first doping level x to a substrate; (b) applying a second layer of $W_xV_{1-x}O_2$, with a second doping level x to a top surface of the base layer; and (c) annealing the deposited films to form a final graded doped film of a total thickness of 100 nm or less.

The method of any preceding or following implementation, further comprising applying a third layer of $W_xV_{1-x}O_2$, with a third doping level x to a top surface of the second layer; and applying additional layers of $W_xV_{1-x}O_2$ consecutively to form the final graded doped film.

The method of any preceding or following implementation, further comprising controlling a thickness of the base layer and each additional layer of the final graded doped film.

The method of any preceding or following implementation: wherein the film layers have progressively increasing thicknesses from a top surface to a bottom surface of the final graded doped thin film; and wherein the dopant percentages of the layers from the top surface to the bottom surface of the final graded doped film increase from 0% dopant to 3% dopant.

The method of any preceding or following implementation: wherein the film layers have progressively decreasing thicknesses from a top surface to a bottom surface of the final graded doped thin film; and wherein the dopant percentages of the layers from the top surface to the bottom surface of the final graded doped film decrease from 3% dopant to 0% dopant.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| | Layer Index | | | | | |
| Substrate | Sample 1 PE Tape | Sample 2 PE Tape | Sample 3 PE Tape | Sample 4 PE Tape | Sample 5 Scotch Tape | Dopant % |
| --- | --- | --- | --- | --- | --- | --- |
| 1 | 15 nm | 20 nm | 22 nm | 22 nm | 22 nm | 0% |
| 2 | 12 nm | 16 nm | 18 nm | 18 nm | 18 nm | 0.75% |
| 3 | 9 nm | 12 nm | 14 nm | 14 nm | 14 nm | 1.3% |
| 4 | 6 nm | 8 nm | 10 nm | 10 nm | 10 nm | 2.0% |
| 5 | — | — | — | 6 nm | 6 nm | 3.0% |

What is claimed is:

1. A controllable emissivity film, comprising a composite of multiple $WVO_2$ thin film layers with graded W doping, each of said layers having a thickness and a dopant percentage and a total thickness of 100 nm or less, wherein said multiple film layers have progressively increasing thicknesses from a top surface to a bottom surface of said composite $WVO_2$ thin film.

2. The film of claim 1, further comprising a substrate coupled to said $WVO_2$ thin film.

3. The film of claim 2, further comprising:
   removing the final graded doped $WVO_2$ thin film from the substrate; and
   coupling the film to a mechanically flexible substrate.

4. The film of claim 1, wherein said multiple film layers have progressively decreasing dopant percentages from a top surface to a bottom surface of said $WVO_2$ thin film.

5. The film of claim 4, wherein said dopant percentages of said layers from the top surface to the bottom surface decrease from 3% dopant to 0% dopant per volume.

6. The film of claim 1, wherein said multiple film layers have progressively increasing dopant percentages from a top surface to a bottom surface of said $WVO_2$ thin film.

7. The film of claim 6, wherein said dopant percentages of said layers from the top surface to the bottom surface increase from 0% dopant to 3% dopant per volume.

* * * * *